United States Patent
Wang et al.

(10) Patent No.: US 7,290,206 B2
(45) Date of Patent: Oct. 30, 2007

(54) CONVERTING DOCUMENTS USING A GLOBAL PROPERTY INDICATING WHETHER EVENT LOGGING IS PERFORMED ON CONVERSION FILTERS

(75) Inventors: Steve Wang, Cary, NC (US); Robert C. Weir, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/895,686

(22) Filed: Jul. 21, 2004

(65) Prior Publication Data
US 2006/0017947 A1   Jan. 26, 2006

(51) Int. Cl.
G06F 15/00   (2006.01)

(52) U.S. Cl. ...................... 715/523; 715/513

(58) Field of Classification Search ................ 715/500, 715/501.1, 522–524, 513
See application file for complete search history.

(56) References Cited

U.S. PATENT DOCUMENTS

| | | | |
|---|---|---|---|
| 5,513,323 A | | 4/1996 | Williams |
| 5,655,130 A | * | 8/1997 | Dodge et al. ............... 715/511 |
| 6,487,566 B1 | | 11/2002 | Sundaresan |
| 6,502,236 B1 | * | 12/2002 | Allen et al. ................. 717/136 |
| 6,725,426 B1 | | 4/2004 | Pavlov |
| 2002/0026461 A1 | | 2/2002 | Kutay |
| 2002/0143816 A1 | | 10/2002 | Geiger |
| 2003/0126556 A1 | | 7/2003 | Soetarman |
| 2003/0158854 A1 | * | 8/2003 | Yoshida et al. ............. 707/101 |
| 2003/0182452 A1 | | 9/2003 | Upton |
| 2004/0025117 A1 | | 2/2004 | Ingersoll |
| 2004/0030995 A1 | | 2/2004 | Bhogal |
| 2004/0078760 A1 | | 4/2004 | Melhem |
| 2004/0103367 A1 | | 5/2004 | Riss |

* cited by examiner

*Primary Examiner*—Cesar B Paula
(74) *Attorney, Agent, or Firm*—McGuinness & Manaras LLP

(57) ABSTRACT

A system for providing document conversion services that uses XML (eXtensible Mark-up Language). A document type definition (DTD) defines tags and attributes for document conversion services, and includes a number of global variable definitions. Each "convertor" tag defines a document conversion filter, using a "filter" tag contained within it. Within each convertor tag, multiple input and output tags describe the capabilities of the convertor, and can be used to define the input document types and output document types for the associated filter. The filter tag can have a "class" attribute or the like, that may be used to provide a fully qualified class name for the filter. A "remote" tag defines whether the conversion for an associated filter is performed on an identified remote server computer system. The global variables are visible to all the convertor entities and may be used to activate logging of activities for various purposes.

16 Claims, 4 Drawing Sheets

```
<?xml version="1.0"?>
<!ELEMENT convertors (global*, convertor+)>

<!ELEMENT global (property*)>
<!ELEMENT property (EMPTY)>
<!ATTLIST property type CDATA "name" #IMPLIED>
<!ATTLIST property type CDATA "value" #IMPLIED>

<!ELEMENT convertor (input+, output+, filter+, remote*, property*)>
<!ELEMENT input (#CDATA)>
<!ELEMENT output (#CDATA)>
<!ELEMENT filter (#PCDATA)>
<!ATTLIST filter type CDATA "class" #IMPLIED>
<!ELEMENT remote (#PCDATA)>
<!ATTLIST remote type CDATA "protocol" #IMPLIED>
```

DTD 10

*FIG. 1*

```
<global>                                                    ← 53
    <property name="ODC_LOG" value="ODC_DEBUG"/>
</global>
```
52 brackets the global block; 56 points to "ODC_LOG"; 58 points to "ODC_DEBUG".

```
<convertor>                                                 ← 55
    <input>application/msword</input>
    <input>application/vnd.lotus-wordproc</input>
    <input>application/html</input>
    <input>application/rtf</input>
    <input>application/ami</input>
    <input>application/manu</input>
    <input>application/sow</input>
    <input>application/wp6</input>
    <input>application/wpf</input>
    <input>application/ws</input>
    <input>application/xy</input>
    <output>application/vnd.ibm-odcrte.zip</output>
    <output>application/html.zip</output>
    <filter class="com.ibm.wps.odc.convert.text.Doc2RTE"/>
    <remote protocol="http">convertor.odc.ibm.com</remote>
</convertor>
```
54 brackets the convertor block; 60 brackets the <input> entries; 62 brackets the <output> entries; 64 points to the <filter> line; 66 points to the <remote> line.

XML 50

*FIG. 2*

CONVERTING DOCUMENTS USING A GLOBAL PROPERTY INDICATING WHETHER EVENT LOGGING IS PERFORMED ON CONVERSION FILTERS

FIELD OF THE INVENTION

The present invention relates generally to software systems for providing electronic document format conversion, and more specifically to a method and system for providing an XML (eXtensible Mark-up Language)-driven document conversion service.

BACKGROUND OF THE INVENTION

As it is generally known, in modern networked computer systems, electronic document conversion has become common and necessary in many circumstances. For example, even though Web browser technology has become the standard user interface for many computer users, many non-HTML files must nonetheless be stored, managed, viewed and edited when using Web-based server systems, such as what are generally referred to as Web portals. Examples of such non-HTML files include some files in certain formats defined or provided by Microsoft® Corporation and/or Lotus®. While there exist individual file converters or filters for converting certain types of documents to certain other document types, existing systems currently lack sufficiently efficient and/or functionally rich descriptions for constructing a document conversion service system.

It would therefore be desirable to have a document conversion system that provides the ability to start with a canonical representation of the conversion system, including a formal and functionally rich description of the conversion system.

SUMMARY OF THE INVENTION

To address the above described and other shortcomings of existing systems, a new method and system for providing document conversion service are disclosed. The disclosed system uses XML (eXtensible Mark-up Language) to provide document conversion services. As disclosed herein, a document type definition (DTD) defines a number of tags and attributes for the document conversion service, and includes a number of global variable definitions. Each "convertor" tag defines a document conversion filter. Within each convertor tag, multiple input and output tags describe the capabilities of the convertor, and can be used to define the input document types and output document types for the associated filter. A filter tag defines the conversion filter software object that is to be used for the convertor.

Tags in the disclosed system can further have certain specific attributes that are significant for providing document conversion services. For example, the disclosed filter tag can have a "class" attribute or the like. If used in a Java® language implementation, a class attribute will be interpreted as a fully qualified class name for the filter. A "remote" tag defines whether the conversion for an associated filter is performed on an identified remote server computer system. With the introduction of the remote tag, the disclosed system advantageously operates as a distributed computing system. The global variables of the disclosed system are visible to all the convertor entities, and may, for example, be used to activate logging of activities for various purposes, such as error logging, and/or logging of debugging information.

The disclosed document conversion system is operable to provide responses to various document conversion related service requests, such as the following:

1) List all document types that a given document type can be converted to.
2) List all document types that can be converted to a given document type.
3) Given a first document type and a second document type, find the best conversion method, in terms of fewest conversion steps, best fidelity conversion method, or fastest executing conversion method from the first document type to the second document type.
4) List all computer nodes in a computer network, including a local node and remote nodes, that can convert a first document type to a second document type.

Thus there is disclosed a document conversion system that provides the ability to start with a canonical representation of the conversion system, and that includes a formal and functionally rich format for describing the conversion system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 shows an example document type definition (DTD) in an illustrative embodiment of the disclosed document conversion system;

FIG. 2 shows an example of a convertor and global variables in an illustrative embodiment of the disclosed document conversion system;

DETAILED DESCRIPTION OF EXEMPLARY EMBODIMENTS

Figure 3:
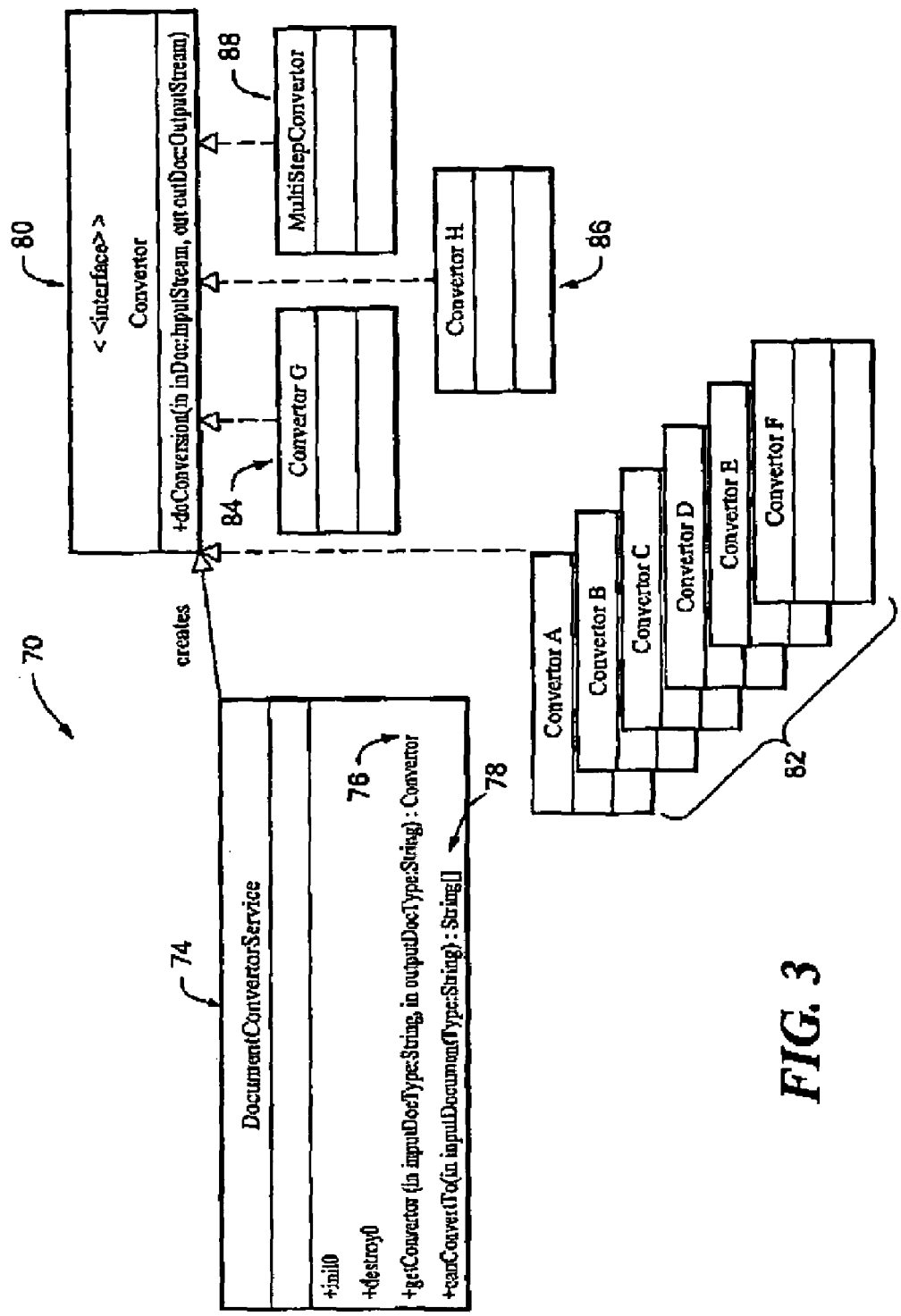
FIG. 3 shows a unified modeling language (UML) class diagram showing classes of interest in an illustrative embodiment of the disclosed document conversion system.

The disclosed system may advantageously be embodied using XML (extensible Mark-up Language) programming constructs, including a document type definition (DTD). As it is generally known, a DTD may be used to define tags and attributes describing the contents of an XML document. The DTD can accordingly define the functional meanings and relationships between tags and attributes in an XML document, such as the where tags are allowed to appear, and which tags can be contained within other tags. Application programs can be designed to process an XML document using an associated DTD to properly process and/or control the XML document's contents.

In the disclosed system, the DTD 10 of FIG. 1 provides a convertors tag definition 12 for a document conversion system. The convertors tag definition 12 allows multiple global elements 14 and convertor elements 16. The global tag definition 18 specifies global properties 20 shared by all instances of converter elements 16. The property tag definition 22 within the global tag definition 18 allows values of global parameters to be defined through a name attribute 24 and a value attribute 26 for each global property. The global properties provided using the DTD 10 may, for example, be used to determine values for various specific, useful global variables, such as parameters used to determine debugging and/or event logging settings.

The convertor tag definition 28 defines the capabilities and characteristics of multiple, individual document conversion filters. Each document conversion filter processed using the convertor tag definition 28 can include input, output, filter, remote and other tags defined within the convertor tag definition 28. Specifically, the input tag definition 30 enables indication of the MIME document types that the document conversion filter can recognize as input documents. As it is generally known, MIME stands for Multipurpose Internet Mail Extensions, a specification for formatting non-ASCII messages so that they can be sent over the Internet, using e-mail programs. Existing MIME document types include graphics, audio, and video messages, and messages in character sets other than ASCII. Custom MIME types may also be defined, and a new version, called S/MIME, supports encrypted messages.

The output tag definition 32 enables indication of the MIME document types that the document conversion filter can convert the input documents to. The remote tag definition 34 enables indication that an associated document conversion takes place on a remote document conversion server computer system. Within the remote tag definition 34, the remote type attribute definition 36 enables a remote conversion protocol to be specified such as HTTP (Hyper-Text Transfer Protocol), Remote Procedure Calls, Web Services, or the like. The filter tag definition 38 allows indication of a name and/or location of the document conversion filter software object to be used, and the associated filter type attribute definition 40 further allows for specification of a filter software object, as through a fully qualified class name.

Those skilled in the art will recognize that the DTD for the disclosed XML based conversion system is not limited by the example DTD 10 shown in FIG. 1. Various specific modification may be made, including adding new attributes to the convertor tag definition 28 to add additional features for the document conversion filters within the disclosed system.

As noted above, the disclosed system provides for global properties to be defined across multiple document conversion filters. These properties are visible to all document conversion filters in the disclosed system, which allows for error logging, general event logging, and debug information logging across all document conversion filters in the disclosed system. The global properties of the disclosed system can be used to describe what type of events to be logged, and where the log of those events is to be stored.

FIG. 2 shows an example of XML code 50 that can be processed using the DTD 10 of FIG. 1. The XML code 50 is shown including a global variables portion 52 provided using a global tag 53, and a document conversion filter 54 provided using a convertor tag 55. The global variables portion 52 includes an indication "ODC_LOG" of an event logging function or program to be applied, and an indication "ODC_DEBUG" to be passed to the event logging function that indicates specifically how the event logging function is to operate, for example in terms of which events are to be logged.

The document conversion filter 54 can, for example, accept eleven types of input documents, as defined by the input tag expressions 60. For purposes of concise illustration, the input document types are shown including Microsoft® Word ("msword"), Lotus® word processing ("lotus-wordpro"), HTML ("html"), rich text ("rtf"), and others. The output tag expressions 62 provide for two types of output documents. Also for purposes of concise illustration, the output document type indications specify two application specific output types ("vnd.odcrte.zip" and "html.zip"). In the illustrative embodiment, the input and/or output document types may indicate any MIME document type.

The document conversion processing provided using the document conversion filter 54 is performed using a document conversion software object defined in the filter tag 64, and indicated by a value class attribute in the filter tag 64, consisting of fully the qualified class name "com.ibm.wps.odc.convert.text.Doc2RTE". The presence of the remote tag 66 indicates that document conversions processing using the document conversion filter 54 are performed on a remote computer server system identified by the string "convertor.odc.ibm.com", and accessed using the HTTP protocol for transmission of original and converted data streams.

While in the example XML code 50 of FIG. 2 a single document conversion filter 54 is shown for purposes of concise illustration, the disclosed system is not so limited, and those skilled in the art will recognize that XML code processed in the disclosed system may contain multiple specific document conversion filters.

The disclosed XML based document conversion system is further operable to combine two document conversion filters, such as the document conversion filter 54, in order to form what may be referred to as a "conversion pipe". Such a conversion pipe operates based on the input and output document types defined within a convertor tag, such as the convertor tag 55. If an output document type of a first document conversion filter matches an input document type of a second document conversion filter, then the disclosed system may operate to make use of the two document conversion filters to construct a conversion pipe which converts an input document type of the first document conversion filter to an output document type of the second document conversion filter.

FIG. 3 shows a unified modeling language (UML) class diagram 70 showing classes of interest in an illustrative embodiment of the disclosed document conversion system. As it is generally known, UML is a general-purpose notational language for specifying and visualizing software, especially object-oriented software systems. In the object model shown by the class diagram 70, DocumentConvertorService object class 74 provides a document conversion service. The getConvertor( ) method 76 is a "factory method" that locates, initializes and returns a Convertor object instance through the Convertor interface 80. Each Convertor object created in this way is capable of converting from the input document type to the output document type. Given a Convertor object instance, a caller using the embodiment of the disclosed system shown in FIG. 3 can perform a document conversion by passing in an InputStream with the contents of the source document and an OutputStream where the converted document is written. Examples of Convertor object classes are shown in FIG. 3 including a set of Convertor object classes 82 for a set of related document formats, for one or more predetermined, related application programs. Another example of a Convertor object class is the Convertor G object class 84. Instances of the Convertor G object class 84 are operable to convert documents into HTML format. Objects of the Convertor H object class 86 are operable to convert input documents into XML format documents. Additionally, objects of the MultiStepConvertor object class 88 are operable to perform document conversions using Convertor pipes consisting of multiple Convertor object instances chained together and used sequentially to receive a document in a document type understood as an input document type for one of the multiple Convertor object instances, and to produce an output document in a document format produced by another of the multiple Convertor object instances.

Figure 4:
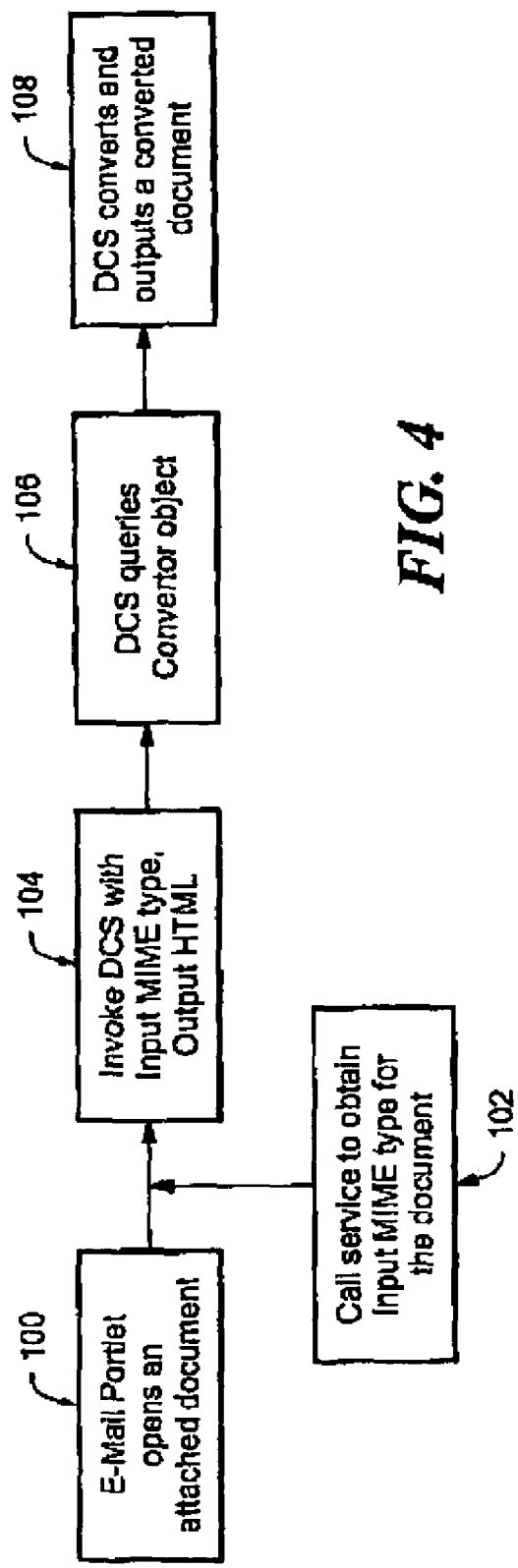
FIG. 4 is a flow diagram showing use of the disclosed document conversion system in an embodiment that operates to open an electronic mail (email) attachment as HTML (HyperText Mark-up Language) for an email portlet.

FIG. 4 is a flow diagram showing use of the disclosed document conversion system in an embodiment that operates to open an electronic mail (e-mail) attachment as HTML (HyperText Mark-up Language) for an e-mail service of a Web Portal, such as an e-mail Portlet. As shown in FIG. 4, at step 100, the e-mail Portlet service opens an e-mail attachment of a type that must be converted before being displayed to the user. For example, the e-mail attachment may be in Lotus® Word Pro format, or any other format that must be converted. At step 102, the e-mail Portlet service calls a service, such as a Document Capability Service as provided in the IBM® Mail Portlet system, that is operable to provide a MIME type associated with the attached document that is to converted.

At step 104, the disclosed document conversion system (DCS) is invoked with indications of the input document MIME type, and an output format indication of HTML. At step 106, the disclosed system operates to instantiate and/or invoke one or more document conversion filters appropriate for the specified input and output document formats. At step 108, the disclosed system outputs the converted document in the specified output document format. The output provided at step 108 may be compressed, for example using the generally known ZIP file format.

Figure 5:
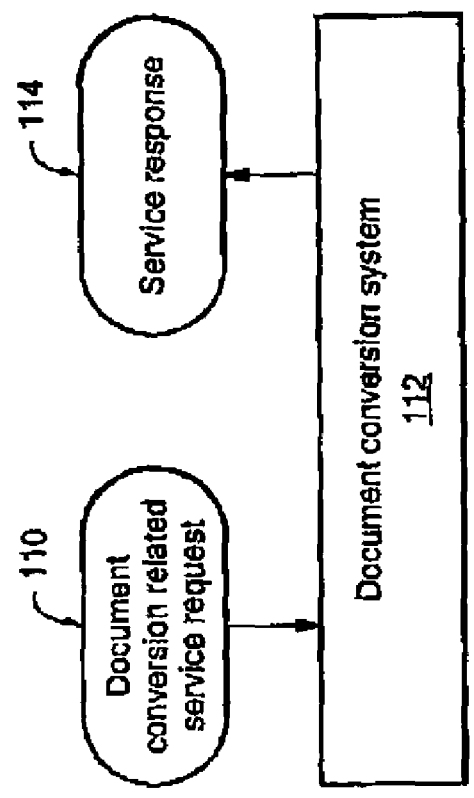
FIG. 5 is a flow diagram showing document conversion system requests processed by an embodiment of the disclosed system.

FIG. 5 is a flow diagram showing document conversion system requests processed by an embodiment of the disclosed system. As shown in FIG. 5, a document conversion related service request 110 is passed to the disclosed document conversion system 112, and a service response 114 is provided as a result. The document conversion related service request 110 may include the following requests:

1) List all document types that a given document type can be converted to.

2) List all document types that can be converted to a given document type.

3) Given a first document type and a second document type, find the best conversion method, in terms of fewest conversion steps, best fidelity conversion method, or fastest executing conversion method from the first document type to the second document type.

4) List all computer nodes in a computer network, including a local node and remote nodes, that can convert a first document type to a second document type.

The disclosed document conversion system may be applied in many specific use contexts. For example, in the area of document editing, a user may receive a spreadsheet via e-mail in MS-Excel format detailing a customer's order requirements for a new widget. The user may wish to edit the spreadsheet to add her comments on the priorities of the requirements, and save it in a database for all employees to read. The user can first detach the spreadsheet and save it into another software system, such as, for example, an IBM® Portal Document Management (PDM) system. Then, she can navigate to the document in the PDM system, and select an editing function. When she selects the editing function in the PDM system, a transparent conversion of the document from MS-Excel to a format understood by a light weight spreadsheet editor using the disclosed system takes place. The user can then add her comments and save the document back to the PDM system.

With regard to document exporting, the user may subsequently want to send the previously commented spreadsheet back to the customer, but the customer may not have the light weight spreadsheet editor, so the user needs to convert it back to MS-Excel format for customer. The user can then find the document as stored in the PDM system, and click on an export button. She is then presented with a list of supported export target document formats, including HTML, PDF, Lotus 123 and MS-Excel. She chooses MS-Excel, provides a new file name, and saves the output to her local file system. The disclosed system converts the input light weight spreadsheet document to MS-Excel format. The user then composes a new e-mail to the customer and attaches the output MS-Excel file to it.

The disclosed system further conveniently facilitates document full-text extraction. For example, in the case where a user is a Portal Administrator, he may want a Portal Search, for example based on a full text library such as the Juru system provided by IBM®, to index all documents in a document repository. The user may set up a batch process to do this at a predetermined time each day. The batch process extracts each document using a document access service, such as the WPCP (WebSphere Portal Content Publishing) service provided by IBM®. The disclosed system can then be invoked to convert each document into an XML document, such as, for example, a SearchML XML format document, that has just the content and metadata for the document, but no styling or formatting. The Juru system can then extract information from this output format document for building its search index.

While the disclosed XML based document conversion system may be implemented in Java, it is in fact computing language independent, as long as the selected implementation language is capable of parsing XML.

FIGS. 3-5 are block diagram and flowchart illustration of methods, apparatus (s) and computer program products according to an embodiment of the invention. It will be understood that each block of FIGS. 3-5, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the may be embodied using a variety of specific command structures. Accordingly, the invention should not be viewed as limited except by the scope and spirit of the appended claims.

We claim:

1. A apparatus for providing document conversion, comprising:
    a document type definition stored on a computer readable medium, said document type definition defining a document conversion element containing a convertor element for specifying a plurality of document conversion filters, said document conversion element further containing a global element for specifying at least one global property applicable to each of said plurality of document conversion filters, wherein said convertor element defines
    at least one input tag for specifying at least one corresponding input document type,
    at least one output tag for specifying at least one corresponding output document type,
    at least one filter tag for specifying at least one corresponding software object to be used for converting documents from said at least one input document type to said at least one output document type; and
    further comprising a global property generated based on said document type definition, said global property comprising an indication of whether event logging is to be performed across a plurality of document conversion filters generated based on said document type definition.

2. The system of claim 1, wherein said convertor element further defines a remote tag for specifying an identity of a remote computer system on which said software object to be used for converting documents from said at least one input document type to said at least one output document type is located.

3. The system of claim 1, further comprising program code stored on said computer readable medium and operable to process a plurality of document conversion related service requests, wherein said plurality of document conversion related service requests includes a request for a list of all document types that a document of a given document type can be converted to.

4. The system of claim 1, further comprising program code stored on said computer readable medium and operable to process a plurality of document conversion related service requests, wherein said plurality of document conversion related service requests includes a request for a list of all document types that can be converted to a given document type.

5. The system of claim 1, further comprising program code stored on said computer readable medium and operable to process a plurality of document conversion related service requests, wherein said plurality of document conversion related service requests includes a request for indication of a preferred document conversion filter for converting a document of a first document type to a document of a second document type.

6. The system of claim 1, further comprising program code stored on said computer readable medium and operable to process a plurality of document conversion related service requests, wherein said plurality of document conversion related service requests includes a request for a list of all nodes in a computer network that are operable to convert a first document type to a second document type.

7. The system of claim 1, further comprising program code stored on said computer readable medium operable to chain a first and a second of said plurality of said document conversion filters together in the case where an output document type of said first one of said plurality of document conversion filters matches an input document type of said second one of said plurality of document conversion filters, and to convert a document of an input document type of the first document conversion filter to an output document type of the second document conversion filter.

8. A method for providing document conversion, comprising:
    forming a plurality of document conversion filters and at least one global property responsive to a document type definition stored on a computer readable medium, said document type definition defining a document conversion element containing a convertor element specifying said plurality of document conversion filters, said document conversion element further containing a global element specifying at least one global property applicable to each of said plurality of document conversion filters, wherein said convertor element defines
    at least one input tag for specifying at least one corresponding input document type,
    at least one output tag for specifying at least one output document type, and
    at least one filter tag for specifying at least one corresponding software object to be used for converting documents from said at least one input document type to said at least one output document type; and
    further comprising generating a global property based on said document type definition, said global property comprising an indication of whether event logging is to be performed across a plurality of document conversion filters generated based on said document type definition.

9. The method of claim 8, wherein said convertor element further defines a remote tag for specifying an identity of a remote computer system on which said software object to be used for converting documents from said at least one input document type to said at least one output document type is located.

10. The method of claim 8, further comprising processing a plurality of document conversion related service requests, wherein said plurality of document conversion related service requests includes a request for a list of all document types that a document of a given document type can be converted to.

11. The method of claim 8, further comprising processing a plurality of document conversion related service requests, wherein said plurality of document conversion related service requests includes a request for a list of all document types that can be converted to a given document type.

12. The method of claim 8, further comprising processing a plurality of document conversion related service requests, wherein said plurality of document conversion related service requests includes a request for indication of a preferred document conversion filter for converting a document of a first document type to a document of a second document type.

13. The method of claim 8, further comprising processing a plurality of document conversion related service requests, wherein said plurality of document conversion related service requests includes a request for a list of all nodes in a computer network that are operable to convert a first document type to a second document type.

14. The method of claim 8, further comprising:
   chaining a first and a second of said plurality of said document conversion filters together in the case where an output document type of said first one of said plurality of document conversion filters matches an input document type of said second one of said plurality of document conversion filters; and
   converting a document of an input document type of the first document conversion filter to an output document type of the second document conversion filter.

15. A system for providing document conversion, comprising:
   means for forming a plurality of document conversion filters and at least one global property responsive to a document type definition stored on a computer readable medium, said document type definition defining a document conversion element containing a convertor element specifying said plurality of document conversion filters, said document conversion element further containing a global element specifying at least one global property applicable to each of said plurality of document conversion filters, wherein said convertor element defines
      at least one input tag for specifying at least one corresponding input document type,
      at least one output tag for specifying at least one corresponding output document type, and
      at least one filter tag for specifying at least one corresponding software object to be used for converting documents from said at least one input document type to said at least one output document type; and
   means for generating a global property based on said document type definition, said global property comprising an indication of whether event logging is to be performed across a plurality of document conversion filters generated based on said document type definition.

16. A computer program product including a computer readable medium, said computer readable medium having a computer program for providing document conversion stored thereon, said computer program comprising:
   program code for forming a plurality of document conversion filters and at least one global property responsive to a document type definition stored on said computer readable medium, said document type definition defining a document conversion element containing a convertor element specifying said plurality of document conversion filters, said document conversion element further containing a global element specifying at least one global property applicable to each of said plurality of document conversion filters, wherein said convertor element defines
      at least one input tag for specifying at least one corresponding input document type,
      at least one output tag for specifying at least one corresponding output document type, and
      at least one filter tag for specifying at least one corresponding software object to be used for converting documents from said at least one input document type to said at least one output document type; and
   program code for generating a global property based on said document type definition, said global property comprising an indication of whether event logging is to be performed across a plurality of document conversion filters generated based on said document type definition.

\* \* \* \* \*